Figure 7:
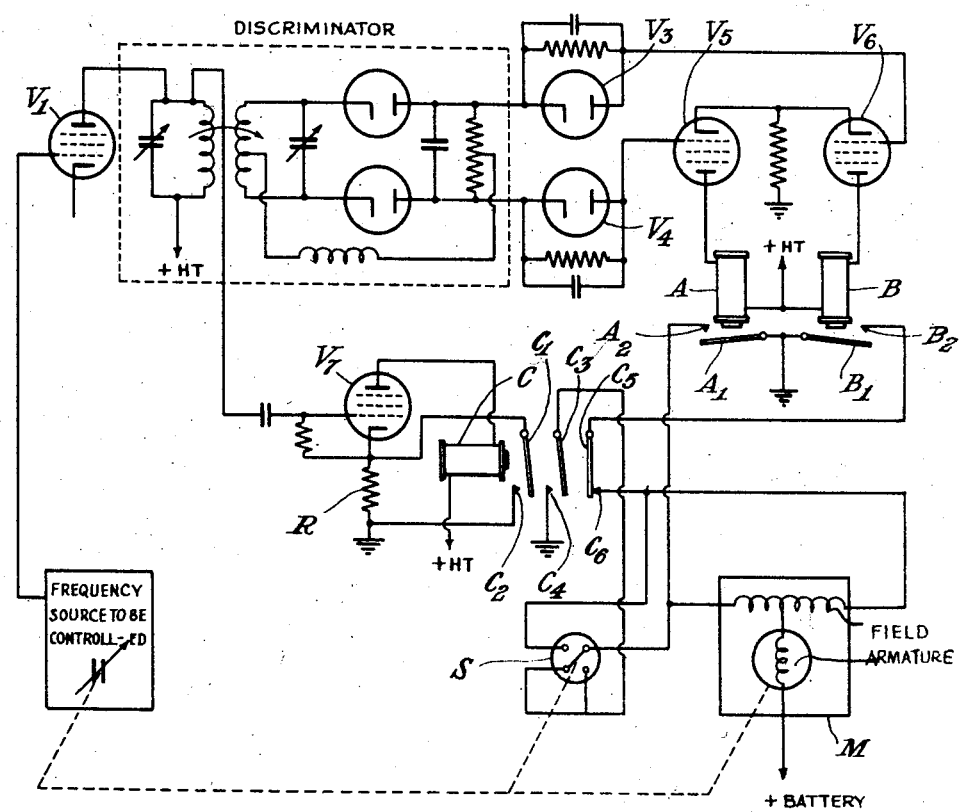
Figure 10:
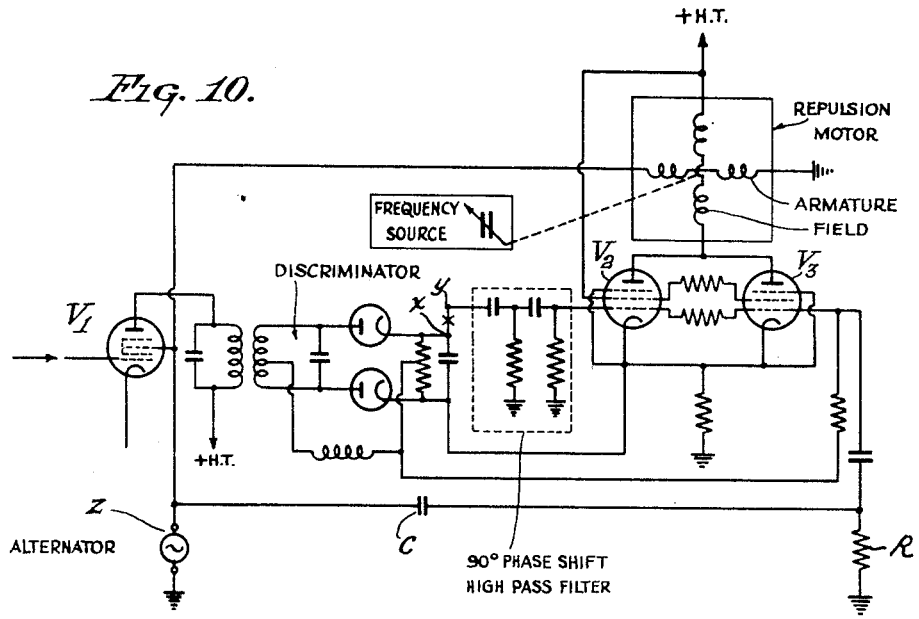
Figure 11:
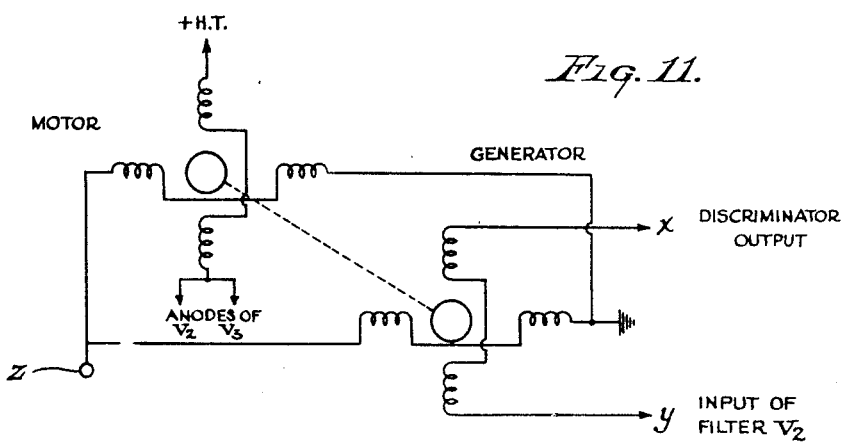

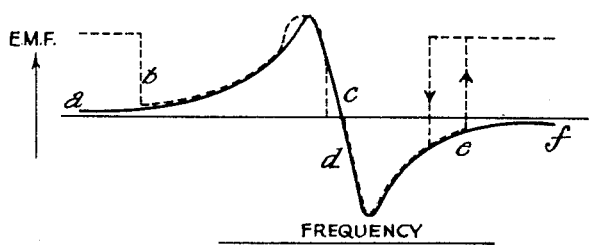
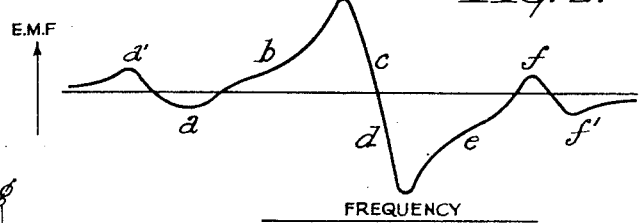
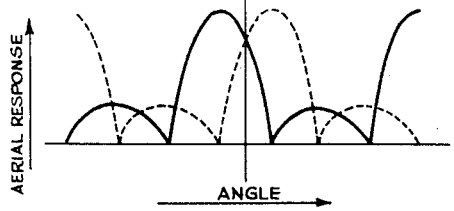
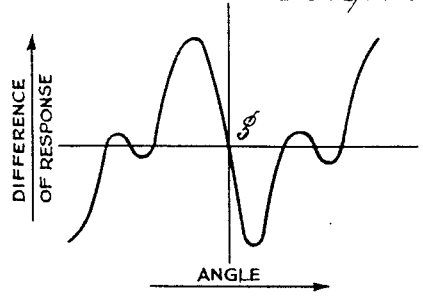
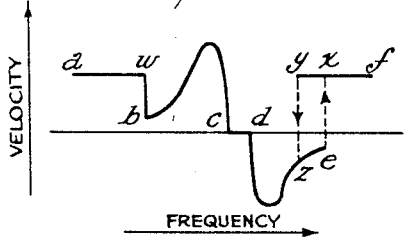
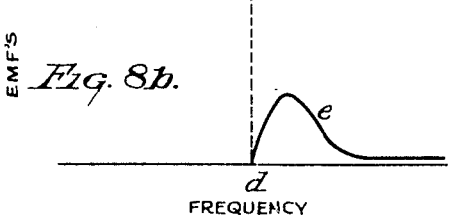
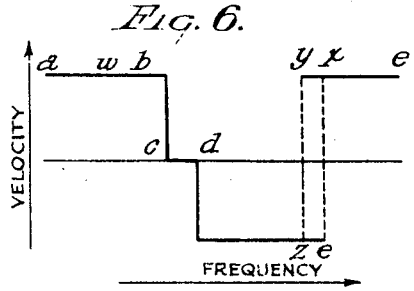

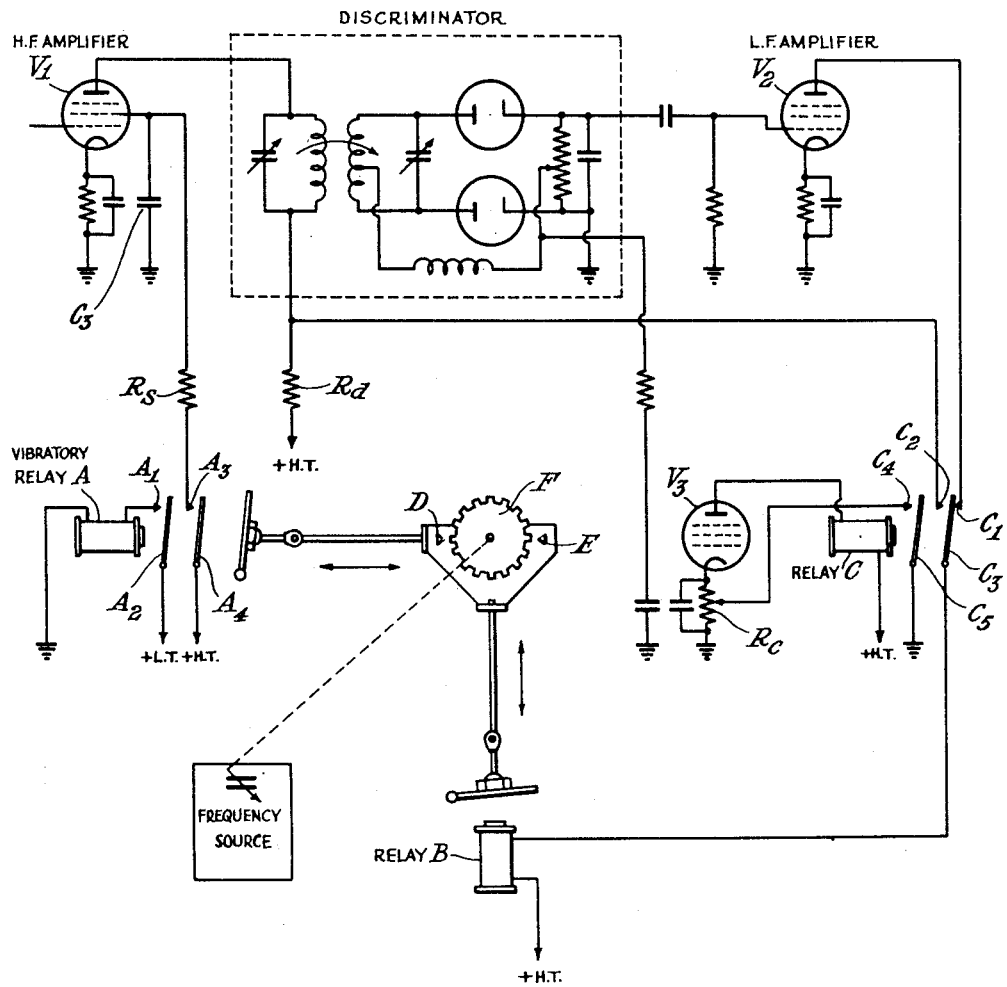

Dec. 6, 1949     C. E. G. BAILEY     2,490,190
ELECTROMECHANICAL CONTROL SYSTEM
Filed Dec. 1, 1944     4 Sheets-Sheet 4

CHRISTOPHER EDMUND GERVASE BAILEY
INVENTOR.

BY

ATTORNEY.

Patented Dec. 6, 1949

2,490,190

UNITED STATES PATENT OFFICE 2,490,190

ELECTROMECHANICAL CONTROL SYSTEM

Christopher Edmund Gervase Bailey, Bournemouth, Hants, England, assignor to The Mullard Radio Valve Company Limited, London, England Application December 1, 1944, Serial No. 566,211
In Great Britain September 15, 1943

Section 1, Public Law 690, August 8, 1946
Patent expires September 15, 1963

8 Claims. (Cl. 318—231)

The invention relates to electro-mechanical systems for the automatic control of physical quantities such as the temperature of a substance or the frequency of an oscillation.

It is an object of the invention to provide improved electro-mechanical systems of the type in which when the quantity to be controlled deviates from its assigned value, a corresponding electrical quantity is produced which in turn brings about a displacement of the mechanical element in such a direction as to cause the quantity to be controlled to return substantially to the assigned value.

Further objects of the invention will appear from the following description and the appended drawing forming part of the specification and in which:

Figs. I, II, III and IV graphically show the variations in an electrical quantity normally produced by variations of the quantity to be controlled in electro-mechanical control systems.

Figs. V and VI graphically show the response characteristic of electro-mechanical control systems according to the invention.

Fig. VII is a schematic diagram of an electromechanical control system according to the invention.

Figs. VIIIa and VIIIb graphically illustrate the variations in generated potential in the control system shown in Fig. VII.

Fig. IX schematically illustrates an electromechanical control system according to another embodiment of the invention.

Fig. X schematically illustrates a control system according to a further embodiment of the invention.

Fig. XI illustrates a modification of the control system of Fig. X.

Electro-mechanical systems are known for the automatic control of physical quantities, such as the temperature of a substance, or the frequency of an oscillation, wherein an electrical quantity, such as an electromotive force, is governed by variations in the quantity whose control is desired; and the displacement of the mechanical elements is in turn governed in direction by variations of this electrical quantity. In such a system, when the quantity whose control is required deviates from its assigned value, the mechanical element is displaced in such a direction as to cause the said quantity to return substantially to the said value.

In some cases, however, it is desired to apply such electromechanical automatic control to a quantity, the electrical quantity derived from which varies in a suitable manner only over a limited range of variation of the quantity whose control is required. For example, the E. M. F. at the output terminals of a well-known type of frequency discriminator varies with the frequency applied to the input terminals in the manner shewn by the solid line in Fig. 1 of the accompanying drawings. Herein over the ranges $bc$ and $de$ the E. M. F. is sufficiently large to operate the mechanical element of the control; and, if the input frequency drifts due to causes in the external system over any part of the range $bcde$ it will be brought back within the limits $cd$, which may be made narrow by suitable design. However, if the frequency reaches one of the ranges $ab$ or $ef$ sufficiently remote from $cd$, the mechanical element is not actuated, and control is lost. If, moreover, the velocity as well as the direction of mechanical displacement is governed by the E. M. F., the system will move unduly slowly in the neighbourhoods of $b$ and $e$.

An even more undesirable case is illustrated by Fig. II. Here the frequency at the input terminals of the discriminator is derived from the beats between the frequency whose control is desired and a selected harmonic of a crystal oscillator. Harmonics of this crystal oscillator other than that selected will typically possess sufficient intensity to cause bends such as $a'a$ and $ff'$ in the response curve. If the frequency input to the discriminator falls in such a region $a'a$ or $ff'$, the control system may operate in such a manner as to keep this frequency input between the limits $a'a$ or $ff'$ instead of the desired limits $cd$.

A case similar to that described above occurs in known systems for radio direction-finding, wherein the difference of response, at a given angle of arrival, of two directional aerial systems is used to supply the derived electrical quantity, and the mechanical system operates by rotating the aerial systems to make this difference small, with the object of bringing the aerial systems to an assigned angular relation with the direction of arrival. If now the aerial systems have a geometrical size of more than half the wavelength being received, their angular response patterns, shewn by the firm and dotted lines of Fig. III may possess subsidiary "lobes," and hence the E. M. F. derived from their difference, shewn in Fig. IV, pass through zero at points other than the assigned point $g$. According to the previous art, such a system would result in angular relations other than the assigned relation being maintained between the aerial systems and the direction of arrival of the waves. Accordingly such direction-finding systems have been in the past restricted by the employment of aerial systems of size less than half a wavelength, which restriction will be recognized as undesirable by those skilled in the art.

According to the present invention, the mechanical element of an electromechanical automatic control system is arranged to be governed over a certain range by variations in an electrical control quantity and to be displaced over another range or ranges in an assigned direction; while operation of the device in an undesired manner is prevented by including means for causing the transition from at least one of these ranges to another to be abrupt and to possess hysteresis. The word "hysteresis" as used herein does not refer narrowly to magnetic hysteresis but means "a lagging of effect after the forces acting are changed or withdrawn" (cf. Beadrell, Dictionary of Scientific Terms, 1935 ed.).

Various specific embodiments of the invention are hereinafter described, together with methods for improving the precision and operating speed of the control system.

The method of operation of the present invention, and in particular, the action of the means for causing an abrupt change marked by hysteresis, may be illustrated by comparing Fig. I and Fig. V, the curve of Fig. V being shown by dashed line in Fig. I.

In Fig. V, the ordinate now represents not the E. M. F. but the velocity of displacement of the mechanical element which is caused by the E. M. F. by the employment of known means, such as an electric motor. This velocity is shewn as if it were roughly proportional to the excess of E. M. F. over a certain threshold.

According to the present invention, instead of allowing the motor to stop in ranges $ab$ and $cd$ of Fig. I, we impose a certain motion on it by using, for example, a relay and a source of constant E. M. F. The relay is then operated by frequency-responsive means, such as a tuned circuit followed by a rectifier. The velocity will then vary with change of frequency in the manner shewn by curve $awbcde$.

In the transition from $e$ to $f$, the axis of no-motion is crossed; but it is important that the motor should not stop at such a crossing-point. According to the present invention, an abrupt change is made between $e$ and $f$ by causing the change-over device to possess hysteresis or "backlash." In the method being described, for example, the relay may be provided with a self-locking circuit. Then if the frequency changes from $f$ to $d$, the relay will not operate at $xe$ but only at some frequency further removed from $f$, say $yz$ on the diagram. Thus with a repeated change of frequency over this range of hysteresis, the velocity of the motor will change in the manner shewn by the curve $exyz$, and in a cyclic direction indicated by the arrows.

If the velocity of the mechanical elements varies discontinuously with the impressed E. M. F. as in a system using electro-magnetic clutches for control, the corresponding curve is that of Fig. VI.

We regard the provision of a motion of this type embodying hysteresis, as an essential part of our invention. The abrupt change of velocity between $b$ and $w$ is, on the other hand, not essential to the proper working of the system, and the object may be equally well attained by a change-over device using a variable resistor or a controlled thermionic amplifier, in which the curve $awbc$ is smooth and continuous.

Again, it is not essential that the velocity should be uniform, as shewn, in the regions $aw$ and $ey$. The only requisite in this respect is that the velocity be in the same direction and of a convenient magnitude.

If the control device is required to operate over a certain range of motion, switches may be arranged to be operated at either extreme of this range, reversing the motion in those ranges in which it is in an assigned direction.

We shall now describe more particularly a form of this invention adapted for automatic frequency control. In Fig. VII, input frequency to be controlled derived from a source of known construction and shewn in block form is applied to the grid of a valve $V_1$. (In this and succeeding figures, such arrangements for the supply of operating potentials to valves etc. as are easily applied by those versed in the art will be omitted from the figures, for the sake of clarity.) The anode of $V_1$ is connected to a normal frequency-discriminator circuit, shown bounded by dotted lines.

By means of diodes $V_3$ and $V_4$, E. M. F.'s varying with frequency in the manner shown in Figs. VIII$a$ and VIII$b$ respectively are applied to the grids of D. C. amplifiers $V_5$ and $V_6$ respectively. $V_5$ and $V_6$ operate relays A and B, which by means of contacts $A_1$, $A_2$, $B_1$, and $B_2$ rotate motor M, which possesses a reversing field, in one or other direction. Over the range $b$ to $e$ (Fig. VIII) sufficient E. M. F. is available from the primary of the discriminator transformer to cut off valve $V_7$, and thereby release relay C in its anode circuit. Outside this range, however, relay C holds contacts $C_3C_4$ closed and $C_5C_6$ open; thus the motor runs in an assigned direction.

The necessary hysteresis in the action of C is obtained by the action of contacts $C_1$ and $C_2$ which, when closed, short-circuit a resistor R in the cathode circuit of $V_7$, thereby further increasing its anode current.

Motor M is mechanically connected to a variable condenser governing the input frequency. Switches shewn as snap switch S operated at the required extremes of travel reverse the direction of motion given by the holding of relay C.

In another embodiment of this invention, shewn in Fig. IX, relay A is aranged to be self-oscillatory by including in its energising circuit contacts $A_1A_2$. Contacts $A_3$ and $A_4$ alternately make and break the screen current of an H. F. amplifier $V_1$. The discriminator output, consisting of pulses whose magnitude and sense are determined by the discriminator curve, Fig. I or Fig. II, is passed to an L. F. amplifier $V_2$. Over the operating range $bcde$ valve $V_3$ is cut off, relay C closes contacts $C_1$ and $C_3$ in Fig. IX, so that relay B responds to these pulses.

The time constant of the screen decoupling condenser $C_8$ and screen feed resistor $R_8$ of $V_2$ is so adjusted that the armatures of A and B operate in time-quadrature.

The armature of A is connected by a hinged pin to a plate capable of motion in the plane of the figure. On this plate are mounted knife-edges D and E which, as A oscillates, alternately touch the toothed wheel F. The armature of B is similarly connected to the plate, moving it at right angles to the first motion. If the movements of B and A are in time-quadrature, and of suitable magnitude, it is clear that F will rotate; and as the motion of B is annulled or reversed in phase, so will F stop or counter-rotate.

F is connected by suitable gearing to the condenser of the oscillator whose frequency is to be controlled. Over the range $bcde$ of Fig. I or II, the motion of F will be governed by the discriminator curve. Outside this range, however, valve $V_3$ is no longer cut off; so that relay C holds and $C_3$ is made to $C_2$. A series of pulses independent of the discriminator then arises from the drop in the resistor $R_a$ in the anode of $V_1$, which results in the rotation of F in an assigned direction.

The self-holding action of relay C is produced by contacts $C_4C_5$ which short a portion of the cathode resistor $R_c$ of $V_3$.

Another embodiment of the invention adapted to the same purpose is illustrated in Fig. X. The input frequency is applied to the input grid of a tube $V_1$, which is followed by a discriminator. The discriminator output is transferred by a high-pass resistance-capacity filter, introducing a phase shift of 90°, to the grid of a pentode $V_2$. A second pentode $V_3$ is connected as a metastable D. C. amplifier, or "kallirotron relay" to the screen, control grid and cathode of $V_2$. The anodes of $V_2$ and $V_3$ are commoned to the field winding of a repulsion motor, whose rotor is excited by an alternator connected between terminal A and earth. Terminal A is also connected to the mixer grid of $V_1$. Thus the output from the discriminator is an E. M. F. of the frequency of the alternator whose magnitude and sense varies about the centre frequency of the discriminator.

The circuit constants of the kallirotron are so adjusted that when the input frequency is near the centre frequency of the discriminator and a negative bias from the centre-tap of the discriminator load is fed to the grid of $V_3$, the latter is inoperative and $V_2$ operative. The repulsion motor therefore turns in a direction and with a speed controlled by the deviation of the input frequency from the centre frequency of the discriminator. When the input frequency is remote from the discriminator centre frequency, however, $V_3$ is less biassed and becomes operative, while $V_2$ becomes inoperative. Alternating input to $V_3$ is derived through a phase-shifting network C, R from terminal Z. The motor therefore turns in an assigned direction.

An undesirable effect encountered in this embodiment of the invention is that the inertia of the rotor of the motor causes it to rotate after the output from the discriminator has fallen to zero; and the corresponding change in input frequency causes it to reverse and repeat this process, oscillating about its proper position. By means of certain additions to the circuit, now to be described, this effect may be diminished or eliminated.

The motor is mechanically coupled, as indicated by the dotted line in Fig. XI, to a similar device, hereinafter referred to as the generator, one of whose sets of windings i. e. the rotor winding is also excited by being connected between terminal Z on Fig. X and earth. The second set of windings i. e. the field winding is connected in series with the input to $V_2$ from the discriminator. When the generator is at rest, no E. M. F. appears across the last-named winding, because of the symmetry of the structure. When, however, the rotor of the generator is turned by the motor, the currents in the rotor induce an E. M. F. in the field winding of the generator algebraically proportioned to the angular velocity of the rotor. If this E. M. F. be applied in proper phase to the input grid of $V_2$, the resulting current in the motor tends to inhibit the tendency of the rotor of the latter to oscillate in the manner described.

The particular embodiments of the invention described above have been directed towards the automatic control of an oscillator frequency. It is obviously, however, that their use is not restricted to such applications, and that they may equally be adapted to control other variables, and in particular, to control the aerial systems of goniometers of automatic direction-finding systems.

I claim:

1. An electro-mechanical automatic control system for adjusting apparatus controlling a variable quantity to an assigned equilibrium value selected from a plurality of potential equilibrium values, comprising electro-mechanical means for adjusting said apparatus, means responsive to variations of said quantity to generate a voltage having amplitude and sign variations proportional to variations of the quantity from the said equilibrium values, means responsive to said voltage variations to energize said electro-mechanical means proportional to the voltage variations corresponding to variations of the quantity within a predetermined range of variations of the quantity about the assigned equilibrium value, and means responsive to variations of the quantity beyond the said predetermined range to continuously energize the electro-mechanical means and adjust the said quantity through potential equilibrium values beyond the said predetermined range in a direction carrying said quantity toward said predetermined range, said last named means possessing hysteresis whereby the action thereof causes said quantity to fall within said predetermined range.

2. An electro-mechanical automatic control system for adjusting apparatus controlling a variable quantity to an assigned equilibrium value selected from two potential equilibrium values, comprising electro-mechanical means for adjusting said apparatus to quantity values within a given range of operation including values of said quantity corresponding to each of said equilibrium values, means responsive to variations of said quantity to generate a voltage having amplitude and sign variations proportional to variations of the quantity from the said equilibrium values, means responsive to said voltage variations to energize said electro-mechanical means proportional to the voltage variations corresponding to variations of the quantity within a predetermined range of variations of the quantity about the assigned equilibrium value, means responsive to variations of the quantity beyond the said predetermined range to continuously energize the electro-mechanical means and adjust the said quantity through potential equilibrium values beyond the said predetermined range in a direction carrying said quantity toward said predetermined range, said last named means possessing hysteresis whereby the action thereof causes said quantity to fall within said predetermined range, and means responsive to variations of said quantity to reverse the direction of travel of said electro-mechanical means at values of the said quantity corresponding to the limits of the said given range.

3. An electro-mechanical automatic control system for adjusting apparatus controlling a variable quantity to an assigned equilibrium value, comprising an electro-mechanical member for adjusting said apparatus, means responsive to variations of said quantity to generate a voltage having amplitude and sign variations proportional to variations of the quantity from the said equilibrium value within a given range, means responsive to said voltage variations to energize said electro-mechanical member proportional to the voltage variations corresponding to variations of the quantity within the said given range, means responsive to said quantity variations to generate a potential having an amplitude proportional to variations of the quantity, a relay member having a set of contacts interposed between said energizing means and said electro-mechanical member and a set of contacts for selectively controlling the electro-mechanical member, means responsive to the amplitude of said potential to actuate said relay at values of said potential corresponding to variations of the quantity beyond the given range to thereby control said electro-mechanical member independently of said energizing means, and holdover means responsive to the actuation of said relay to maintain said relay actuated at variations of the quantity beyond the given range.

4. An electro-mechanical automatic control system for adjusting the frequency of a wave generator to an assigned equilibrium value, comprising an electro-mechanical member coupled to said generator for adjusting the frequency of the wave, means responsive to the frequency of said wave to generate a voltage having amplitude and sign variations proportional to variations of the frequency from the assigned equilibrium value within a given range, means responsive to said voltage variations to energize the electro-mechanical member proportional to the voltage variations corresponding to frequency variations within the said given range, means responsive to the frequency of said wave to generate a potential proportional to the said frequency variations, a relay member having a first set of contacts interposed between said energizing means and the electro-mechanical member for disconnecting the energizing means and the electro-mechanical member upon actuations of the relay, a second set of contacts for energizing the electro-mechanical member upon actuation of the relay and a third set of contacts, means responsive to the amplitude of said potential to actuate the relay at values of said potential corresponding to frequency variations beyond the given range, and means responsive to the actuation of said relay comprising said third set of contacts to maintain said relay actuated at frequency variations beyond the said given range independent of the value of said potential.

5. An electro-mechanical automatic control system for adjusting the frequency of a wave generator to an assigned equilibrium value, comprising an electro-mechanical member comprising a rotor element coupled to said generator for adjusting the frequency of the wave and two electrically energized magnetic armatures having directions of motion substantially at right angles to each other for rotating said rotor in a direction determined by the relative phase of the energizing currents of the armatures, means to intermittently actuate one of said armatures and to amplitude modulate the said wave at the said intermittent rate and in time quadrature relative to the actuation of said armature, means to derive from said modulated wave a voltage having amplitude and sign variations proportional to variations of the frequency from the assigned equilibrium value within a given range, means responsive to said voltage variations to energize the other of said armatures in response to said voltage variations, means responsive to said frequency variations to generate a potential proportional to the said frequency variations, a relay member having a first set of contacts comprising a break contact connected to said energizing means, a contact arm connected to the actuating element of said other armature and a make contact coupled to said modulating means and a second set of contacts comprising a make contact and an arm contact, means responsive to the amplitude of said potential to actuate the relay member at values of said potential corresponding to frequency variations beyond the given range, and means responsive to the actuation of said relay comprising said second set of contacts to maintain the relay actuated at frequency variations beyond the said given range independent of the value of said potential.

6. An electro-mechanical automatic control system for adjusting the frequency of a wave generator to an assigned equilibrium value, comprising an electro-mechanical member having a rotor coupled to said generator for adjusting the frequency of the wave and two windings for rotating the rotor in a direction determined by the relative phase of the currents applied to the windings, means to amplitude modulate the wave, a source of alternating current connected to one of said windings and to said amplitude modulating means, means to derive from the modulated wave a voltage having amplitude and sign variations proportional to variations of the frequency from the assigned equilibrium value within a given range, means to shift the phase of said voltage approximately 90°, a discharge tube having a cathode and a control grid coupled to the said phase shifting means and an anode coupled to the other of said windings, means responsive to said frequency variations to generate a potential proportional to the said frequency variations, a discharge tube having a cathode and a control grid coupled to the said potential generating means, an anode coupled to said other winding and an auxiliary electrode coupled to the control grid of said first named discharge tube, and means to derive from said alternating current source a voltage in phase quadrature to the voltage applied to said first winding, said second discharge tube having circuit constants at which values of said generated potential corresponding to frequency variations beyond the said given range produce cut-off in the said first discharge tube and energization of said second winding through said second discharge tube.

7. An electro-mechanical automatic control system for adjusting the frequency of a wave generator to an assigned equilibrium value, comprising an electro-mechanical member having a rotor coupled to said generator for adjusting the frequency of the wave and two windings for rotating the rotor in a direction determined by the relative phase of the currents applied to the windings, means to amplitude modulate the wave, a source of alternating current connected to one of said windings and to said amplitude modulating means, means responsive to said amplitude modulated wave to generate a voltage having amplitude and sign variations proportional to variations of the frequency of the modulated wave from the said assigned equilibrium value within a given range, means to shift the phase of said voltage approximately 90°, means to derive from said alternating current source a voltage proportional to the angular velocity of said rotor and to add the same in phase opposition to the voltage derived from said generating means, a discharge tube having a cathode and a control grid coupled to the said phase shifting means and an anode coupled to the other of said windings, means responsive to said frequency variations to generate a potential proportional to the said frequency variations, a discharge tube having a cathode and a control grid coupled to the said potential generating means, an anode coupled to said other winding and an auxiliary electrode coupled to the control grid of said first named discharge tube, and means to derive from said alternating current source a voltage in phase quadrature to the voltage applied to said first winding, said second discharge tube having circuit constants at which values of said generated potential corresponding to frequency variations beyond the said given range produce cut-off in the said first discharge tube and energization of said second winding through said second discharge tube.

8. An electro-mechanical automatic control system for adjusting the frequency of a wave source to an assigned equilibrium value comprising a variable impedance element connected to said wave source for adjusting the frequency thereof, an electric motor mechanically coupled to said impedance element, a frequency discriminator coupled to said source for developing an output voltage having amplitude and sign variations proportional to variations of the frequency from the assigned equilibrium value within a given range, means responsive to the output voltage of said discriminator to energize said motor in accordance with output voltage variations derived from said discriminator whereby said motor acts to adjust said variable impedance to the position at which the frequency of said wave source is at the assigned equilibrium value, means responsive to said frequency variations to generate a potential proportional to the said frequency variations, a relay member having a first set of contacts interposed between said energizing means and said motor, a second set of contacts for energizing said motor upon actuation of the relay and a third set of contacts, means responsive to said potential to actuate said relay member at values of said potential corresponding to frequency variations beyond the given range, and means responsive to the actuation of said relay including said third set of contacts to maintain said relay member actuated at frequency variations beyond the said given range independent at the value of said potential.

CHRISTOPHER EDMUND
GERVASE BAILEY.

REFERENCES CITED

The following references are of record in the file of this patent:

UNITED STATES PATENTS

| Number | Name | Date |
|---|---|---|
| 1,985,981 | Edwards | Jan. 1, 1935 |
| 2,251,064 | Martin | July 29, 1941 |
| 2,260,122 | Moore | Oct. 21, 1941 |
| 2,280,019 | Alexanderson | Apr. 14, 1942 |
| 2,303,654 | Newton | Dec. 1, 1942 |

FOREIGN PATENTS

| Number | Country | Date |
|---|---|---|
| 102,887 | Sweden | Oct. 28, 1941 |
| 544,614 | Great Britain | Apr. 21, 1942 |